United States Patent
Sato

(10) Patent No.: US 6,345,384 B1
(45) Date of Patent: Feb. 5, 2002

(54) OPTIMIZED PROGRAM CODE GENERATOR, A METHOD FOR COMPILING A SOURCE TEXT AND A COMPUTER-READABLE MEDIUM FOR A PROCESSOR CAPABLE OF OPERATING WITH A PLURALITY OF INSTRUCTION SETS

(75) Inventor: Hiroaki Sato, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/295,417

(22) Filed: Apr. 21, 1999

(30) Foreign Application Priority Data

Apr. 22, 1998 (JP) ............................................ 10-112459

(51) Int. Cl.[7] .................................................. G06F 9/45
(52) U.S. Cl. ......................................................... 717/9
(58) Field of Search ................................. 717/4, 5, 6, 7, 717/8, 9; 712/1, 42, 43, 209, 229; 703/22, 26, 27

(56) References Cited

U.S. PATENT DOCUMENTS 5,701,489 A * 12/1997 Bates et al. ................... 717/5
5,790,862 A *  8/1998 Tanaka et al. ................. 717/5
5,937,188 A *  8/1999 Freeman ......................... 717/1
6,286,135 B1 *  9/2001 Santhanam ..................... 717/9

OTHER PUBLICATIONS

Lajolo et al., "A compilation-basedsoftware estimation scheme for hardware/software co-simulation", CODES 99, ACM, 1999, pp. 85–89.*
Hwu et al., "Inline function expansion for compiling C programs", ACM, 1989, pp. 246–257.*
Wang, "Precise compile-time performance prediction for superscalar compilers", SIGPLAN 94, ACM 1994, pp. 73–84.*
Getboys, "An efficient model for DSP code generation: Performance, code size, estimated energy", IEEE 1997, pp. 41–47.*

* cited by examiner

*Primary Examiner*—Kakali Chaki
(74) *Attorney, Agent, or Firm*—Oblon, Spivak, McClelland, Maier & Neustadt, P.C.

(57) ABSTRACT

An improved optimization technique is described for a program code for a processor capable of operating on the basis of either one of a plurality of instruction sets in a computer system. The optimization is carried out by the steps of reading said program code of a target program to be optimized, estimating the costs of executable instruction sequences respectively to be obtained by translating said program code on the basis of said plurality of instruction sets; and determining an optimum one of said plurality of instruction sets for translating said program code by evaluating the costs as estimated under a predetermined criteria.

61 Claims, 24 Drawing Sheets

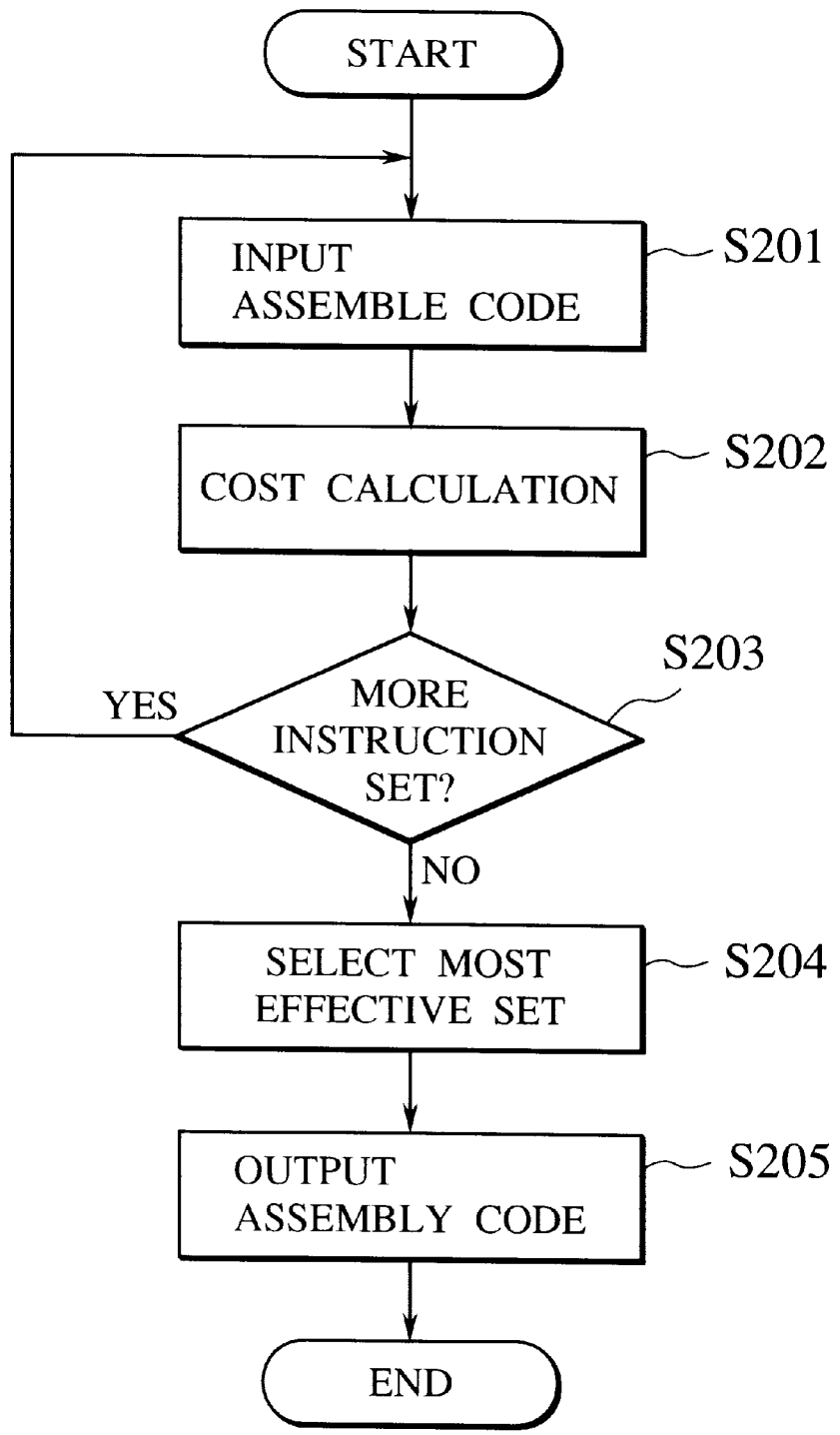

FIG. 4A

| CODE SIZE (byte) | INSTRUCTION SET A | INSTRUCTION SET B |
|---|---|---|
| addiu/addu | 2 | 4 |
| b/btnez | 2 | 4 |
| lw/sw | 2 | 4 |
| li | 2 | 4 |
| move | 2 | 4 |
| elw/esw | 4 | 4 |
| jal | 4 | 4 |
| nop | 2 | 4 |
| jr | 2 | 4 |
| eli | 4 | 4 |
| esll | 4 | 4 |
| lui | 6 | 4 |
| sit | 2 | 4 |
| OVERHEAD CALLING FUNCTION | 0 | 0 |
| OVERHEAD IN OTHER CASES | 8 | 8 |

FIG. 4B

| CLOCK CYCLES (cycle) | INSTRUCTION SET A | INSTRUCTION SET B |
|---|---|---|
| addiu/addu | 1 | 1 |
| b/btnez | 2 | 1 |
| lw/sw | 1 | 1 |
| li | 1 | 1 |
| move | 1 | 1 |
| elw/esw | 2 | 1 |
| jal | 2 | 1 |
| nop | 1 | 1 |
| jr | 1 | 1 |
| eli | 2 | 1 |
| esll | 2 | 1 |
| lui | 3 | 1 |
| sit | 1 | 1 |
| OVERHEAD CALLING FUNCTION | 0 | 0 |
| OVERHEAD IN OTHER CASES | 3 | 2 |

FIG. 5

| INSTRUCTION SET A | | INSTRUCTION SET B |
|---|---|---|
| li r2, 1 | | lui r2, 1 |
| esll r2, r2, 16 | = | |

FIG. 6

```
int  glob [3] ;
int  glob2 [3]  ;
int  glob3 ;
void f(void) ;

main( )  {
        glob3=1 ;
        f ( ) ;
} void f(void)  {
           glob [glob3] = glob2 [glob3] ;
}
```

FIG. 7A

```
. main :
        addiu    sp, -8
        sw       ra, 4(sp)
        li       r2, 1
        move     a3, gp
        esw      r2, sdaoff (_glob3)(r3)
        jal      . f
        nop
        lw       r4, 4(sp)
        move     ra, r4
        addiu    sp, 8
        jr       ra
        nop
```

FIG. 7B

```
. f :
        move     r3, gp
        elw      r2, sdaoff(_glob3)(r3)
        eli      r5, hi(_glob)
        esll     r5, r5, 16
        sll      r2, r2, 2
        elw      r4, sdaoff(_glob3)(r3)
        addu     r2, r5, r2
        sll      r4, r4, 2
        eli      r5, hi(_glob2)
        esll     r5, r5, 16
        addu     r4, r5, r4
        elw      r4, lo(_glob2) (r4)
        esw      r4, lo(_glob) (r2)
        jr       ra
        nop
```

FIG. 8A

```
_main :
    addiu    sp, sp, -8
    sw       ra, 4(sp)
    addiu    r2, r0, 1
    jal      _f
    sw       r2, sdaoff(_glob3)(gp)
    lw       ra, 4(sp)
    jr       ra
    addiu    sp, sp, 8
```

FIG. 8B

```
_f :
    lw       r2, sdaoff(_glob3)(gp)
    lui      r4, hi(_glob)
    sll      r2, r2, 2
    lw       r3, sdaoff(_glob3)(gp)
    addu     r2, r4, r2
    sll      r3, r3, 2
    lui      r4, hi(_glob2)
    addu     r3, r4, r3
    lw       r3, lo(_glob2) (r3)
    jr       ra
    sw       r3, lo(_glob) (r2)
```

FIG. 9

| | CODE SIZE | | CLOCK CYCLES | |
|---|---|---|---|---|
| | INSTRUCTION SET A | INSTRUCTION SET B | INSTRUCTION SET A | INSTRUCTION SET B |
| main | 28bytes | 32bytes | 14cycles | 8cycles |
| f | 46bytes | 44bytes | 23cycles | 11cycles |
| total | 74bytes | 76bytes | 37cycles | 19cycles |

FIG. 10

| | CODE SIZE | | CLOCK CYCLES | |
|---|---|---|---|---|
| | INSTRUCTION SET A | INSTRUCTION SET B | INSTRUCTION SET A | INSTRUCTION SET B |
| main | 28bytes | | 8cycles | |
| f | | 44bytes | | 11cycles |
| total | 72bytes, 25cycles | | 76bytes, 19cycles | |

FIG. 11

```
int  glob3 :

void g(int a)  {
       int i=0, j=0;

while (i++<a)
              glob3 +=i ;
}
```

FIG. 14

| Criteria | CODE SIZE | | CLOCK CYCLES | |
|---|---|---|---|---|
| | INSTRUCTION SET A | INSTRUCTION SET B | INSTRUCTION SET A | INSTRUCTION SET B |
| Block of Code 1 | 4bytes | 8bytes | 3cycles | 2cycles |
| Block of Code 2 | 12bytes | 12bytes | 6cycles | 3cycles |
| Block of Code 3 | 12bytes | 24bytes | 7cycles | 6cycles |
| total | 26bytes | 44bytes | 16cycles | 11cycles |

FIG. 15

|  | CODE SIZE | | CLOCK CYCLES | |
|---|---|---|---|---|
| Block of Code 1 | INSTRUCTION SET A | 4bytes | INSTRUCTION SET B | 2cycles |
| Block of Code 2 | INSTRUCTION SET A | 12bytes | INSTRUCTION SET B | 3cycles |
| Block of Code 3 | INSTRUCTION SET A | 12bytes | INSTRUCTION SET B | 6cycles |
| total | | 26bytes | | 11cycles |

FIG.17

```
. main :
        move      r4, gp
        eaddiu    r4, sdaoff (_glob3)
        li        r2, 1
        sw        r2, 0(r4)
        lw        r2, 0(r4)
        eli       r5, hi(_glob)
        esll      r5, r5, 16
        sll       r2, r2, 2
        lw        r4, 0(r4)
        addu      r2, r5, r2
        sll       r4, r4, 2
        eli       r5, hi(_glob2)
        esll      r5, r5, 16
        addu      r4, r5, r4
        elw       r4, lo(_glob2)(r4)
        esw       r4, lo(_glob)(r2)
        jr        ra
        nop
```

FIG.18

```
_main :
        addiu     r3, gp,  sdaoff (_glob3)
        addiu     r2, r0, 1
        sw        r2, 0(r3)
        addiu     r2, r0, 1
        sll       r2, r2, 2
        lui       r4, hi(_glob)
        lw        r3, 0(r3)
        addu      r2, r4, r2
        sll       r3, r3, 2
        lui       r4, hi(_glob2)
        addu      r3, r4, r3
        lw        r3, lo(_glob2)(r3)
        jr        ra
        sw        r3, lo(_glob)(r2)
```

FIG.19

| | CODE SIZE | | CLOCK CYCLES |
|---|---|---|---|
| | INSTRUCTION SET A | INSTRUCTION SET B | |
| main | 50bytes | 56bytes | INSTRUCTION SET A 25cycles / INSTRUCTION SET B 14cycles |

FIG. 20

| | CODE SIZE | CLOCK CYCLES |
|---|---|---|
| main in which f is inlined | INSTRUCTION SET A 50bytes | INSTRUCTION SET B 14cycles |

| 1 | move | r3, gp |
| 2 | elw  | r4, sdaoff(_glob)(r3) |
| 3 | eli  | r5, 0x1234 |
| 4 | esll | r5, r5, 16 |
| 5 | esll | r4, r4, 16 |
| 6 | li   | r2, 1 |
| 7 | esw  | r5, lo(_glob2)(r4) |
| 8 | esll | r2, r2, 16 |
| 9 | addu | r5, r5, r2 |

FIG. 27

| | CODE SIZE | | | CLOCK CYCLES | |
|---|---|---|---|---|---|
| | INSTRUCTION SET A | INSTRUCTION SET B | | INSTRUCTION SET A | INSTRUCTION SET B |
| main | 28bytes | 32bytes | | 14cycles | 8cycles |
| f | 46bytes | 44bytes | | 23cycles | 11cycles |
| total | 74bytes | 76bytes | | 37cycles | 19cycles |

FIG. 28

| | CODE SIZE | |
|---|---|---|
| main | INSTRUCTION SET B | 8cycles |
| f | INSTRUCTION SET B | 44cycles |
| total | 76bytes, 19cycles | |

FIG. 29

| | INSTRUCTION SET A | INSTRUCTION SET B |
|---|---|---|
| main | 84 | 64 |
| f | 138 | 88 |

FIG. 30

| | INSTRUCTION SET B | INSTRUCTION SET B |
|---|---|---|
| main | | 64 |
| f | | 88 |
| total | | 132 |

OPTIMIZED PROGRAM CODE GENERATOR, A METHOD FOR COMPILING A SOURCE TEXT AND A COMPUTER-READABLE MEDIUM FOR A PROCESSOR CAPABLE OF OPERATING WITH A PLURALITY OF INSTRUCTION SETS

BACKGROUND OF THE INVENTION

1. Field of the Invention

The present invention is related to an optimized program code generator, a method for compiling a source text and a computer-readable medium for a processor capable of operating with a plurality of instruction sets.

2. Prior Art

The use of compilers and assemblers in data processing systems to generate assembly code from high level source code or object code from assembly code is well known. Current compilers employ a variety of optimization techniques in order to generate assembly code capable of more efficiently executing program routines, while some skill of a programmer is required for hand assembling.

On the other hand, some processors are capable of operating on the basis of either one of a plurality of instruction sets in a computer system. "TX19" as distributed from Toshiba Corporation is one example of CPUs of this type. In this case, programmers are responsible to select appropriate ones of the plurality of instruction sets as available, e.g., repeating compiling process with different instruction sets.

It will be important to switch the operation mode of the CPU to operate under appropriate one of the plurality of instruction sets from the view point of the size of a memory space to be occupied by the target program and the speed of execution of code. Usually, a programmer has to select the instruction set to be used for each module or function, taking into consideration the purpose of the target program and the restriction upon usage of functions of the CPU.

FIG. 31 is block diagram showing a prior art programming language processor. First of all, the source text 1 of a target program is prepared by coding operation. Next, the source text of the target program is input to a compiler 3. The compiler 3 outputs assembly code 5 through syntax analysis and subsequent processes. Next, the assembly code 5 is input to an assembler 7. In this case, the relocatable object code 9 is generated. Next, the object code 9 is input to a linker 11. In this case, executable code 13 with absolute addresses is generated by the linker 11 from the relocatable object code.

In the case that a plurality of instruction sets are available, a plurality of executable codes 13 are generated with different instruction sets by the programming language processor followed by running the executable codes respectively in order to compare the speeds of execution of code thereof.

While the selection of the most effective instruction set among from the available instruction sets has been manually conducted by each programmer on the basis of experience and examination, it is very difficult to make effective selection because technical factors to be taken into consideration are so many with many combinations of the instruction sets. Conventional compilers make use of the default instruction set unless explicitly indicated.

SUMMARY OF THE INVENTION

The present invention has been made in order to solve the shortcomings as described above. It is an important object of the present invention to provide an improved optimized program code generator for optimizing a program code for a processor capable of operating on the basis of either one of a plurality of instruction sets in a computer system.

It is another associated object of the present invention to provide an improved method for compiling a source text of the target program for a processor capable of operating on the basis of one of a plurality of instruction sets in a computer system.

It is another associated object of the present invention to provide a computer-readable medium containing improved computer-readable program code for optimizing a program code for a processor capable of operating on the basis of either one of a plurality of instruction sets in a computer system.

In brief, the above and other objects and advantages of the present invention are provided by a new and improved optimized program code generator for optimizing a program code for a processor capable of operating on the basis of either one of a plurality of instruction sets in a computer system, the optimization being carried out by the steps of: (a) reading said program code of a target program to be optimized, (b) estimating the costs of executable instruction sequences respectively to be obtained by translating said program code on the basis of said plurality of instruction sets; and (c) determining an optimum one of said plurality of instruction sets for translating said program code by evaluating the costs as estimated under a predetermined criteria.

In accordance with a further aspect of the present invention, a computer-readable medium containing computer-readable program code for optimizing a program code for a processor capable of operating on the basis of either one of a plurality of instruction sets in a computer system is provided with the optimization which is carried out by the steps of: (a) reading said program code of a target program to be optimized, (b) estimating the costs of executable instruction sequences respectively to be obtained by translating said program code on the basis of said plurality of instruction sets; and (c) determining an optimum one of said plurality of instruction sets for translating said program code by evaluating the costs as estimated under a predetermined criteria.

Also, in accordance with a preferred embodiment of the present invention, the step of estimating the costs of executable instruction sequences is carried out by the use of a cost estimation table.

Also, in accordance with a preferred embodiment of the present invention, said cost estimation table includes the cost of each code contained in said object code with respect to the plurality of instruction sets.

Also, in accordance with a preferred embodiment of the present invention, said program code of the target program to be optimized is assembly code.

Also, in accordance with a preferred embodiment of the present invention, the step of estimating the costs of executable instruction sequences is carried out by evaluating the object code corresponding to said program code.

Also, in accordance with a preferred embodiment of the present invention, said object code corresponding to said program code is relocatable.

Also, in accordance with a preferred embodiment of the present invention, said program code of the target program to be optimized is intermediate level language code as output from a parser.

Also, in accordance with a preferred embodiment of the present invention, said program code of the target program is written in Language C.

Also, in accordance with a preferred embodiment of the present invention, the optimized program code generator further comprises, between the step (a) and the step (b), a step (a2) of translating said program code of the target program written in Language C into assembly code by the use of said plurality of the instruction sets.

Also, in accordance with a preferred embodiment of the present invention, the optimized program code generator further comprises, between the step (a2) and the step (b), a step (a3) of detecting dependency of the respective instructions of the assembly code one from another.

Also, in accordance with a preferred embodiment of the present invention, an optimum one of said plurality of instruction sets for translating said program code is determined for each of a plurality of independent instruction sequences which consists only of instructions any one of which can be executed independent from any instruction of another independent instruction sequence.

Also, in accordance with a preferred embodiment of the present invention, the optimized program code generator further comprises, between the step (c) and the step (d), a step (c2) of determining the order of execution of the independent instruction sequences taking into consideration overhead as introduced by inserting an instruction set switching instruction.

Also, in accordance with a preferred embodiment of the present invention, an optimum one of said plurality of instruction sets for translating said program code is determined for each function included in said program code.

Also, in accordance with a preferred embodiment of the present invention, an optimum one of said plurality of instruction sets for translating said program code is determined for each the block of code included in said program code as separated by the branch instruction.

Also, in accordance with a preferred embodiment of the present invention, the step of estimating the costs of executable instruction sequences is carried out by taking into consideration overhead as introduced by inserting an instruction set switching instruction for switching instruction sets.

Also, in accordance with a preferred embodiment of the present invention, said predetermined criteria for determining an optimum one of said plurality of instruction sets is based upon comparison of the executable instruction sequences respectively to be obtained by translating said program code into said executable instruction sequences on the basis of different instruction sets in terms of the size of a memory space to be occupied by each of said executable instruction sequence.

Also, in accordance with a preferred embodiment of the present invention, said predetermined criteria for determining an optimum one of said plurality of instruction sets is based upon comparison of the executable instruction sequences respectively to be obtained by translating said program code into said executable instruction sequences on the basis of different instruction sets in terms of the number of clock cycles required for running each of said executable instruction sequences.

Also, in accordance with a preferred embodiment of the present invention, said predetermined criteria for determining an optimum one of said plurality of instruction sets is based upon comparison of the executable instruction sequences respectively to be obtained by translating said program code into said executable instruction sequences on the basis of different instruction sets in terms of the size of a memory space to be occupied by each of said executable instruction sequence and the number of clock cycles required for running each of said executable instruction sequences in combination with predetermined weights.

Also, in accordance with a preferred embodiment of the present invention, said predetermined criteria for determining an optimum one of said plurality of instruction sets is based upon comparison of the executable instruction sequences respectively to be obtained by translating said program code into said executable instruction sequences on the basis of different instruction sets in terms of the size of a memory space to be required for running said executable instruction sequence.

Also, in accordance with a preferred embodiment of the present invention, the size of a memory space to be required for running said executable instruction sequence is evaluated by sum of the static memory of said executable instruction sequence and the size of a memory space to be occupied by each of said executable instruction sequence.

Also, in accordance with a preferred embodiment of the present invention, the size of a memory space to be required for running said executable instruction sequence is evaluated by sum of the static memory of said executable instruction sequence, an expected stack memory of said executable instruction sequence, and the size of a memory space to be occupied by each of said executable instruction sequence.

Also, in accordance with a preferred embodiment of the present invention, the size of a memory space to be required for running said executable instruction sequence is evaluated by sum of the static memory of said executable instruction sequence, an expected stack memory of said executable instruction sequence, an expected heap memory of said executable instruction sequence, and the size of a memory space to be occupied by each of said executable instruction sequence.

Also, in accordance with a preferred embodiment of the present invention, the optimized program code generator further comprises, between the step (a) and the step (b), a step (a3) of inlining at least one function contained in said program code of the target program into the function which calls said at least one function.

Also, in accordance with a preferred embodiment of the present invention, said function inlined into the function which calls that function is a leaf function which does not call another function.

Also, in accordance with a preferred embodiment of the present invention, said function inlined into the function which calls that function is a leaf function which does not call another function and which is not called from different locations in said program code, the number of which different locations does not exceed a predetermined number.

In accordance with a further aspect of the present invention, a method for compiling a source text of the target program for a processor capable of operating on the basis of one of a plurality of instruction sets in a computer system, comprises the steps of (a) reading said source text of the target program of a target program to be compiled into a memory, (b) estimating the costs of object code respectively to be obtained by compiling said the source text of the target program on the basis of said plurality of instruction sets; (c) determining an optimum one of said plurality of instruction sets for translating said program code by evaluating the costs as calculated under a predetermined criteria; and (d) outputting the object as compiled in accordance with the determination of the optimum instruction sets.

Also, in accordance with a preferred embodiment of the present invention, the step of estimating the costs of the object code is carried out by evaluating the respective instruction contained in the object code obtained by compiling said the source text of the target program on the basis of each instruction set.

Also, in accordance with a preferred embodiment of the present invention, said object code corresponding to said program code is relocatable.

Also, in accordance with a preferred embodiment of the present invention, the step of estimating the costs of the object code is carried out by evaluating intermediate level language code as output from a parser.

Also, in accordance with a preferred embodiment of the present invention, the step of estimating the costs of executable instruction sequences is carried out by the use of a cost estimation table.

Also, in accordance with a preferred embodiment of the present invention, said cost estimation table includes the cost of each code contained in said object code with respect to the plurality of instruction sets.

Also, in accordance with a preferred embodiment of the present invention, an optimum one of said plurality of instruction sets is determined for each function included in said program code.

Also, in accordance with a preferred embodiment of the present invention, an optimum one of said plurality of instruction sets is determined for each the block of code included in said program code as separated by the branch instruction.

Also, in accordance with a preferred embodiment of the present invention, the step of estimating the costs of the object code is carried out by taking into consideration overhead as introduced by inserting an instruction set switching instruction for switching instruction sets.

Also, in accordance with a preferred embodiment of the present invention, said predetermined criteria for determining an optimum one of said plurality of instruction sets is based upon comparison of the assembly code respectively obtained on the basis of different instruction sets in terms of the size of a memory space to be occupied by each of said executable instruction sequence.

Also, in accordance with a preferred embodiment of the present invention, said predetermined criteria for determining an optimum one of said plurality of instruction sets is based upon comparison of the assembly code respectively obtained on the basis of different instruction sets in terms of the number of clock cycles required for running each of the object code.

BRIEF DESCRIPTION OF DRAWINGS

FIG. 3 is a flowchart for explaining the process in the cost estimation step S200.

FIG. 4(a) and FIG. 4(b) is an exemplary cost estimation table.

FIG. 5 is a schematic diagram for explaining compound instructions.

FIG. 6 shows the source text of an exemplary target program written in Language C for use in explanation of this embodiment of the present invention.

FIG. 7(a) shows the assembly code as a result of compiling the function "main" of the source text by the use of the instruction set A.

FIG. 7(b) shows the assembly code as a result of compiling the function "f" of the source text by the use of the instruction set A.

FIG. 8(a) shows the assembly code as a result of compiling the function "main" of the source text by the use of the instruction set A.

FIG. 8(b) shows the assembly code as a result of compiling the function "f " of the source text by the use of the instruction set B.

FIG. 9 is a table showing the total cost of the functions contained in the source text of the target program as a result of the calculation.

FIG. 10 is an explanatory table for explaining the procedure of determining the most effective instruction set among from the available instruction sets in the step S204.

FIG. 11 is shows the source text of an exemplary target program written in Language C for use in explanation.

FIG. 14 is a table showing the respective costs of the blocks of code contained in the source text of the target program as illustrated in FIG. 11 as a result of the calculation.

FIG. 15 is an explanatory table for explaining the procedure of determining the most effective instruction set among from the available instruction sets in the step S204.

FIG. 17 shows the assembly code as a result of the inlining process of the source text of the target program as illustrated in FIG. 6 with the instruction set A.

FIG. 18 shows the assembly code as a result of the inlining process of the source text of the target program as illustrated in FIG. 6 with the instruction set B.

FIG. 19 is a table showing the respective costs of the source text of the target program as illustrated in FIG. 6 as a result of the calculation.

FIG. 20 is an explanatory table for explaining the procedure of determining the most effective instruction set among from the available instruction sets in the step S204.

FIG. 27 is a table showing the total cost of the functions contained in the source text of the target program as a result of the calculation in accordance with the sixth embodiment of the present invention.

FIG. 28 shows the cost estimation step S202 in accordance with the sixth embodiment of the present invention.

FIG. 29 shows the result of evaluation of the function "main" and the function "f" in accordance with the sixth embodiment of the present invention.

FIG. 30 is an explanatory table for explaining the procedure of determining the most effective instruction set among from the available instruction sets in the step S204 in accordance with the sixth embodiment of the present invention.

DETAILED DESCRIPTION OF EMBODIMENTS

An optimized program code generator, a method for compiling a source text, a computer-readable medium containing computer-readable program code for optimizing a program code in accordance with the present invention will be explained will be explained with reference to the accompanying drawings.

As the hardware construction in accordance with an embodiment of the present invention, a computer system such as a main frame, EWS, a personal computer, comprises an CPU which executes processes at various steps described below; a memory unit; a keyboard, a mouse, a light pen or other input device as input means, a flexible disk unit, hard drive unit or other external storage devices; and a display unit such as a CRT and printer, or other output devices as output means. Note here that the above-mentioned CPU comprises the Arithmetic/Logical Unit (ALU) which executes processes at various steps described below and the storage means such as general purpose registers and so forth, which stores the instructions and the data used in those processes. Particularly, the above-mentioned CPU is a processor capable of operating on the basis of either one of a plurality of instruction sets in a computer system by means of an instruction set switching instruction.

Figure 1:
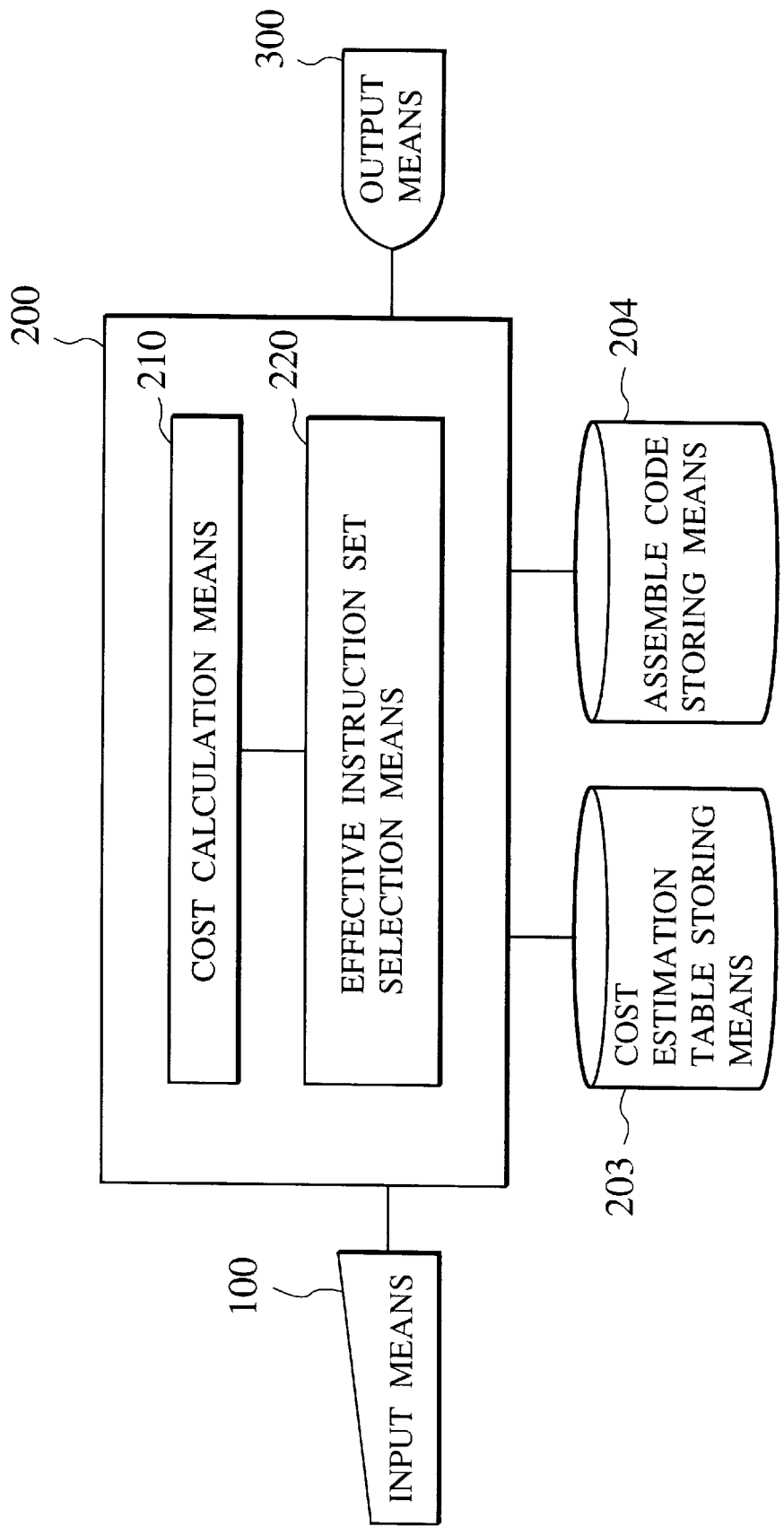
FIG. 1 is a block diagram showing an optimized program code generator in accordance with an embodiment of the present invention as embodied in the form of a computer system as described above.

FIG. 1 is a block diagram showing an optimized program code generator in accordance with an embodiment of the present invention as embodied in the form of a computer system as described above. This optimized program code generator includes a cost estimation table storing means 203 for storing a cost estimation table, a cost calculation means 210 for calculating or estimating the total cost of object code with respect to the plurality of instruction sets, and the effective instruction set selection means 220 for selecting the instruction set of the plurality of instruction sets to be used for generating optimized machine code. The cost estimation table has been prepared to provide the cost of each code with respect to the plurality of instruction sets.

The operation of the optimized program code generator will be explained in details. First of all, the source text of a target program is input to the memory unit through the input means 100. Alternatively, the source text of a target program is designated to the optimized program code generator through the input means 100 in term of the location of the source text in the external storage device, e.g., the name of a text file. In the following explanation, the source text of the target program is written in Language C. However, the source text of the target program is written in any other program language. Also, while in the following explanation the optimization is proceeded with assembler code, object code 9 or executable code 13 may be utilized for the purpose of the optimization in the same manner.

A plurality of instructions are included in assembler code, object code or executable code. The cost of each instruction is calculated in the cost calculation means 210 with respect to the cost estimation table. The cost estimation table consists of the respective instructions along with the costs of the instructions with respect to each instruction set. In this embodiment of the present invention, the costs have been listed in terms of the size of a memory space to be occupied by each instruction and the number of clock cycles required for executing each instruction. The cost estimation table is stored in the cost estimation table storing means 203. By referring to the cost estimation table, the cost calculation means 210 outputs the total costs of the object code generated from the source text of the target program on the basis of the respective instruction sets.

The total costs as calculated are input to the effective instruction set selection means 220 in which the most effective instruction set is selected in accordance with the total cost or a predetermined equation including the respective costs as factors for selection of the instruction set.

The instruction set as selected is outputted to the output means 300 such as a CRT. The output signal may be provided together with the total cost or the predetermined equation including the respective costs as factors for selection of the instruction set. Furthermore, the optimized program code generator may finish generation of object code by assembling the source text, or executable code by assembling the source text and linking object code on the basis of the most effective instruction set as selected, without indication of intermediate results.

The optimized program code generator is usually implemented as a programming language processor such as a compiler.

In the following explanation, the optimized program code generator in accordance with the embodiment of the present invention.

(1) First Embodiment

Next, the optimized program code generator and the code optimization process in accordance with a first embodiment of the present invention will be explained.

Figure 2:
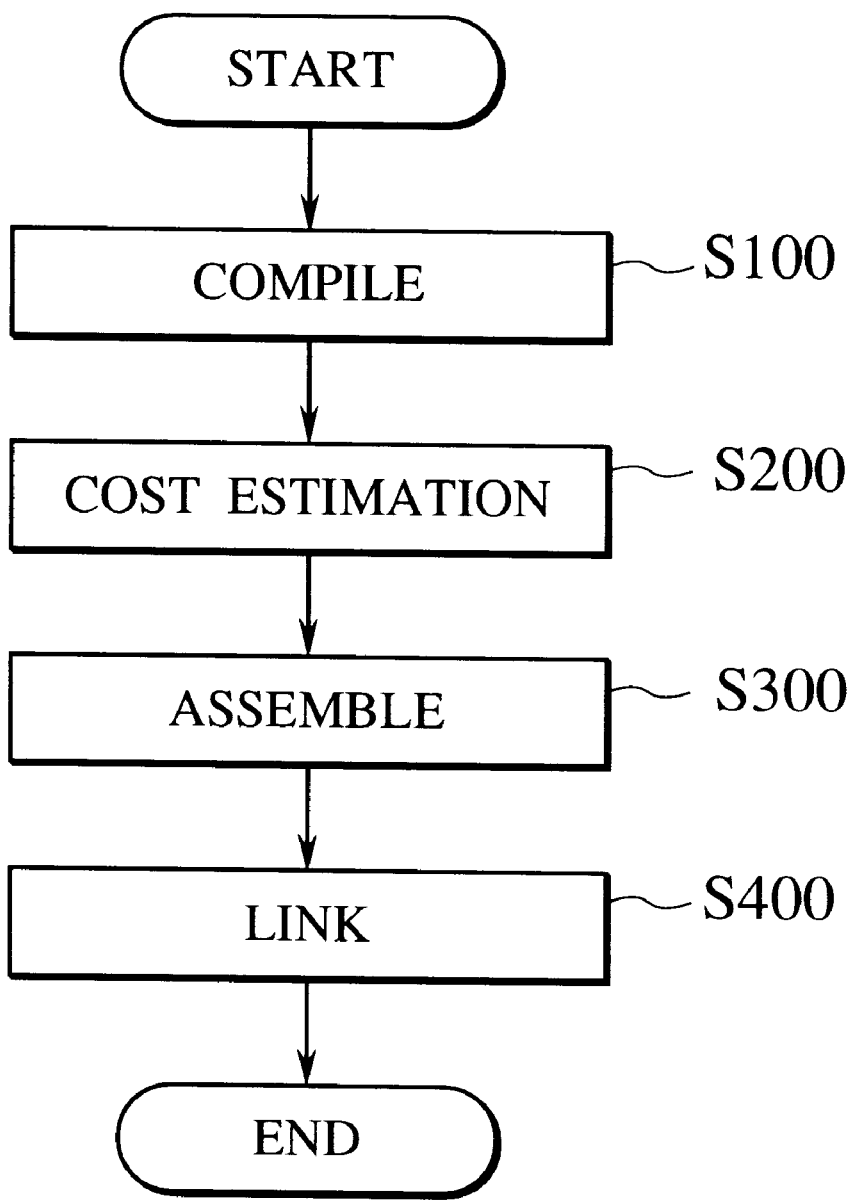
FIG. 2 is a flowchart showing the programming language processing steps in accordance with the first embodiment of the present invention as implemented in a compiler.

FIG. 2 is a flowchart showing the programming language processing steps in accordance with the first embodiment of the present invention as implemented in a compiler. First of all, the compiler does lexical, syntactic, and semantic analysis to translate the code of the input file into the assembly code in the step S100 with the respective instruction sets. Next, the cost estimation of the assembly code as generated is conducted in order to determine the most effective instruction set among from the available instruction sets in the step S200. Next, the assembly code of the most effective instruction set is assembled in order to generate relocatable object code in the step S300. Next, by the use of a linker, an executable code with the absolute addresses is generated from the relocatable object code in the step S400.

FIG. 3 is a flowchart for explaining the process in the cost estimation step S200. First of all, the assembly code is input in the step S201. The cost of the assembly code is calculated in the cost calculation means. The cost calculation is conducted with respect to the cost estimation table. Next, it is judged whether or not there is a further assembly code on the basis of another instruction set in the step S203. In the case that there is a further assembly code, the cost thereof is calculated in the step S202. These assembly codes have been prepared in advance by compiling the source text of the target program for each instruction set.

In the case that the cost calculation has been finished for all the instruction sets, the most effective instruction set is determined among from the available instruction sets in the step S204. The assembly code is then outputted in the step S205. The most effective instruction set is such as having the minimum cost among from the available instruction sets.

Next, the cost calculation as conducted in the step S202 will be explained in details. In this embodiment of the present invention, the most effective instruction set is selected among from the available instruction sets for such functions as a programmer indicates the use of a particular instruction set.

FIG. 4(a) and FIG. 4(b) is an exemplary cost estimation table. In this embodiment of the present invention, two instruction sets are available for the target CPU, i.e., the instruction set A and the instruction set B. One example of such a type of CPUs is "TX19" as distributed from Toshiba Corporation. Of course, this embodiment is applicable to other types of CPUs, e.g., a processor capable of operating on the basis of either one of three or more instruction sets. FIG. 4(a) shows a cost estimation table with respect to the size of a memory space to be occupied by each instruction (together with one or more associated operand if any) while FIG. 4(b) a cost estimation table with respect to the number of clock cycles required for executing each instruction. The cost estimation tables contain the respective costs of all the instructions available in each of the instruction sets.

For example, in the case of the addition instruction (addiu), the size of a memory space to be occupied by the corresponding instruction of the instruction set A is 2 bytes while the size of a memory space to be occupied by the corresponding instruction of the instruction set B is 4 bytes. Also in the case of the addition instruction (addiu), the number of clock cycles required for executing the corresponding opecode of the instruction set A is 1 clock cycle while the number of clock cycles required for executing the corresponding opecode of the instruction set B is 1 clock cycle. Furthermore, the cost estimation table includes the size of a memory space to be occupied by the instruction set switching instruction of each instruction set and the number of clock cycles required for executing the instruction set switching instruction of each instruction set. In this case, it is shown in the cost estimation table that no additional memory space is required by introduction of the instruction set switching instruction of each instruction set and that no clock cycle is required for executing the instruction set switching instruction of each instruction set. This is because, in this embodiment of the present invention, the CPU is TX19 as distributed from Toshiba Corporation in which the instruction set switching instruction is implemented as a jump instruction.

FIG. 5 is a schematic diagram for explaining compound instructions. In the case of TX19, the instruction set A includes some instructions, paired twos of which operatively correspond to single instructions as illustrated in FIG. 5. Generally speaking, a plurality of instructions of one instruction set is equivalent in combination to a single instruction of another instruction set. Such combined instructions are called compound instructions. The cost estimation table contains such compound instructions.

FIG. 6 shows the source text of an exemplary target program written in Language C for use in explanation of this embodiment of the present invention. The source text of the target program consists of a function "main" in which calls a function "f" written in the same source text. The source text is complied. In this case, a single compiler capable of compiling each instruction set or the combination of compilers capable of compiling the respective instruction sets are available. These compilers are capable of outputting assembly code.

FIG. 7(a) shows the assembly code as a result of compiling the function "main" of the source text by the use of the instruction set A while FIG. 7(a) shows the assembly code as a result of compiling the function "f" of the source text by the use of the instruction set A. Also, FIG. 8(a) shows the assembly code as a result of compiling the function "main" of the source text by the use of the instruction set B while FIG. 8(b) shows the assembly code as a result of compiling the function "f" of the source text by the use of the instruction set B. These assembly code texts are input to the optimized program code generator in accordance with the present invention and the costs thereof are calculated on the basis of the cost estimation table. For example, the first column of the source text of the target program as illustrated in FIG. 7(a) is the addiu instruction, which is then evaluated, from the cost estimation table, to take 4 bytes of the size of a memory space to be occupied and one clock cycles required for execution. Furthermore, the second column of the source text of the target program as illustrated in FIG. 7(a) is the sw instruction, which is then evaluated, from the cost estimation table, to take 2 bytes of the size of a memory space to be occupied and one clock cycles required for execution. These sizes and the number of clock cycles of instructions contained in each function are summed respectively for the purpose of the cost calculation.

FIG. 9 is a table showing the total cost of the functions contained in the source text of the target program as a result of the calculation. As shown in the figure, the costs of the function "main" are then evaluated as 28 bytes of the size of a memory space to be occupied in the case of the instruction set A and 32 bytes in the case of the instruction set B. On the other hand, as shown in the figure, the clock cycles required for executing the function "main" are then evaluated as 14 clock cycles in the case of the instruction set A and 8 clock cycles in the case of the instruction set B. Also, the costs of the function "f" are then evaluated as 46 bytes of the size of a memory space to be occupied in the case of the instruction set A and 44 bytes in the case of the instruction set B, while the clock cycles required for executing the function "f" are then evaluated as 23 clock cycles in the case of the instruction set A and 11clock cycles in the case of the instruction set B. Since, in this embodiment of the present invention, the CPU is the TX19 as distributed from Toshiba Corporation in which the instruction set switching instruction is implemented as a jump instruction, there is no overhead as introduced by inserting the instruction set switching instruction even if different instruction sets are used for different functions.

FIG. 10 is an explanatory table for explaining the procedure of determining the most effective instruction set among from the available instruction sets in the step S204. As shown in the figure, these costs of the function "main" and the function "f" are compared and the most effective instruction sets for each function is selected among from the available instruction sets. As a result, in the case of considering the total cost of the size of a memory space to be occupied, the instruction set A is selected for the function "main" while the instruction set B is selected for the function "f". Also, in the case of considering the total cost of the number of clock cycles required, the instruction set B is selected for the function "main" while the instruction set B is selected for the function "f".

Accordingly, in this embodiment of the present invention, the optimization is possible for a CPU capable of operating on the basis of one of a plurality of instruction sets in a computer system by evaluating the total costs of the target program in the case that either one of combination of the plurality of the instruction sets are utilized. Also, it is possible to optimize the object code from the view point of throughout the entirety of the source text of the target program, which has not the case in the conventional technique.

(2) Second Embodiment

Next, the optimized program code generator and the code optimization process in accordance with a second embodiment of the present invention will be explained.

In this embodiment, the code optimization process is applied to in groups of statements rather than in functions. Generally speaking, a source text of the target program consists usually of compound statements each of which is a group of statements enclosed by {} characters. This block of code is treated as a single statement thus allowing the programmer to create a multiple statement body for a simple statement such as associated with a while, for, or if in the case of Language C. The braces define a new program scope so that the present invention will be applied independently for each block of code. In other words, a block of code is started after execution of a branch instruction and terminates before execution of a branch instruction. More exactly speaking, the blocks of code are such as separated by the branch instruction. The optimized program code generator as implemented in a compiler selects the most effective instruction set among from the available instruction sets for each block of code in order to minimize the total cost. In this case, the instruction set switching instruction is inserted, if required, which is also evaluated in combination.

FIG. 11 is shows the source text of an exemplary target program written in Language C for use in explanation. The source text is complied.

Figure 12:
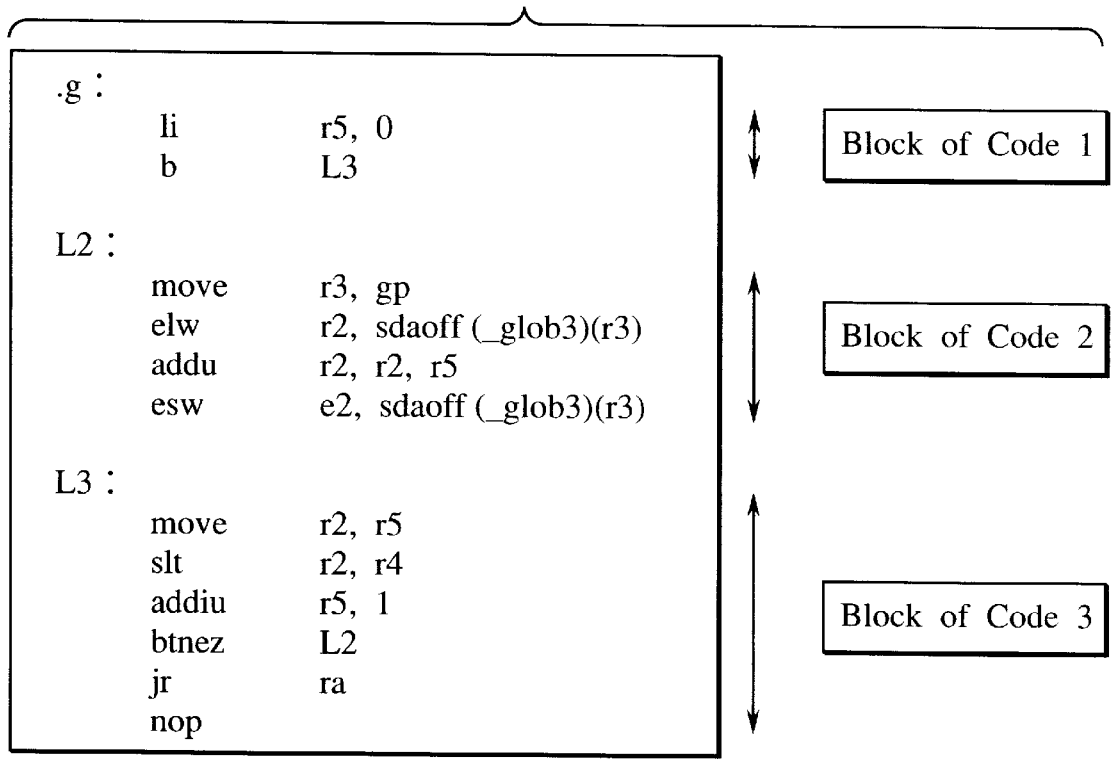
FIG. 12 shows the assembly code as a result of compiling the function "g" of the source text by the use of the instruction set A .
Figure 13:
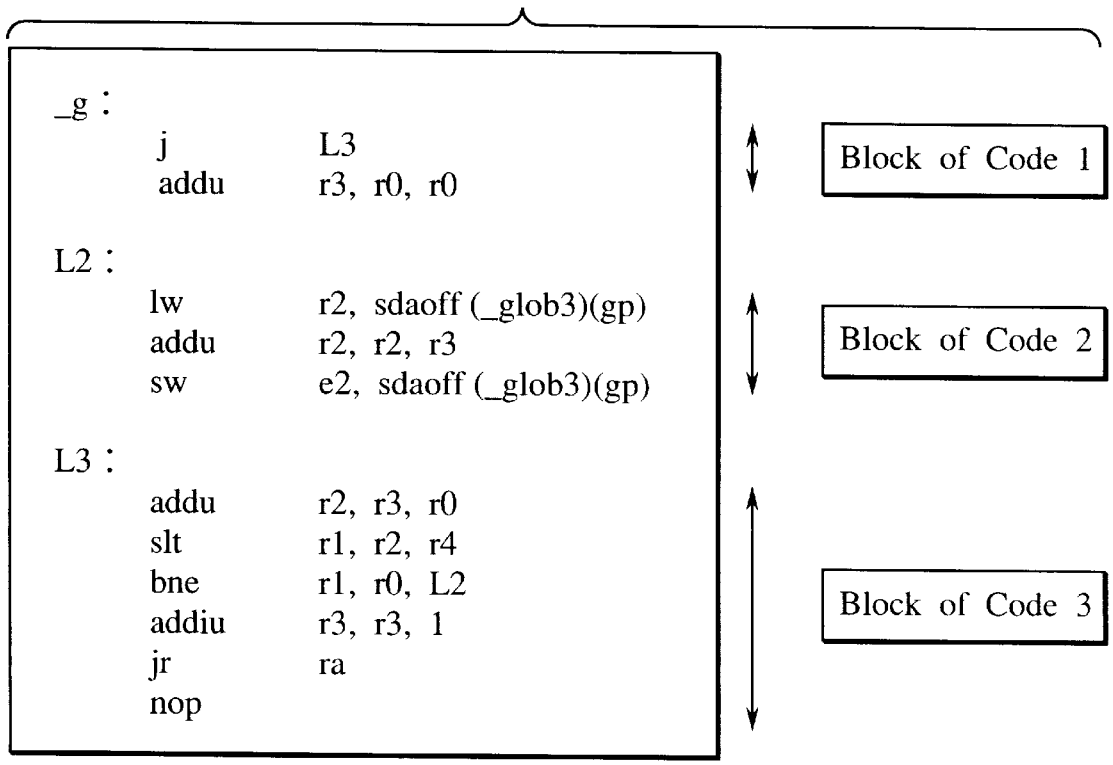
FIG. 13 shows the corresponding assembly code as a result of compiling the function "g" by the use of the instruction set B.

FIG. 12 shows the assembly code as a result of compiling the function "g" of the source text by the use of the instruction set A while FIG. 13 shows the corresponding assembly code as a result of compiling the same function by the use of the instruction set B. In this case, there are three blocks of code in the assembly code as shown in the figure. For the sake of clarity in explanation, these blocks are called as the block of code 1, the block of code 2 and the block of code 3 from the top of the list.

These assembly code texts are input to the optimized program code generator in accordance with the present invention and the costs thereof are calculated on the basis of the cost estimation table as illustrated in FIG. 4.

FIG. 14 is a table showing the respective costs of the blocks of code contained in the source text of the target program as illustrated in FIG. 11 as a result of the calculation. As shown in the figure, the costs of the block of code 1 are then evaluated as 4 bytes of the size of a memory space to be occupied in the case of the instruction set A and 8 bytes in the case of the instruction set B. On the other hand, as shown in the figure, the clock cycles required for executing the same block are then evaluated as 3 clock cycles in the case of the instruction set A and 2 clock cycles in the case of the instruction set B.

FIG. 15 is an explanatory table for explaining the procedure of determining the most effective instruction set among from the available instruction sets in the step S204. As shown in the figure, these costs of the function "main" and the function "f" are compared and the most effective instruction sets for each function is selected among from the available instruction sets. First of all, in terms of the size, it is determined that the block of code 1 and the block of code 3 should be assembled with the instruction set A. On the other hand, the same size of the memory space is occupied in the either case of the instruction set A and the instruction set B. However, in order to avoid overhead of switching instruction sets, the instruction set A is selected in this case. As a result, in terms of the size, it is determined that the instruction set A should be selected for all the blocks of code 1, 2 and 3.

Figure 16:
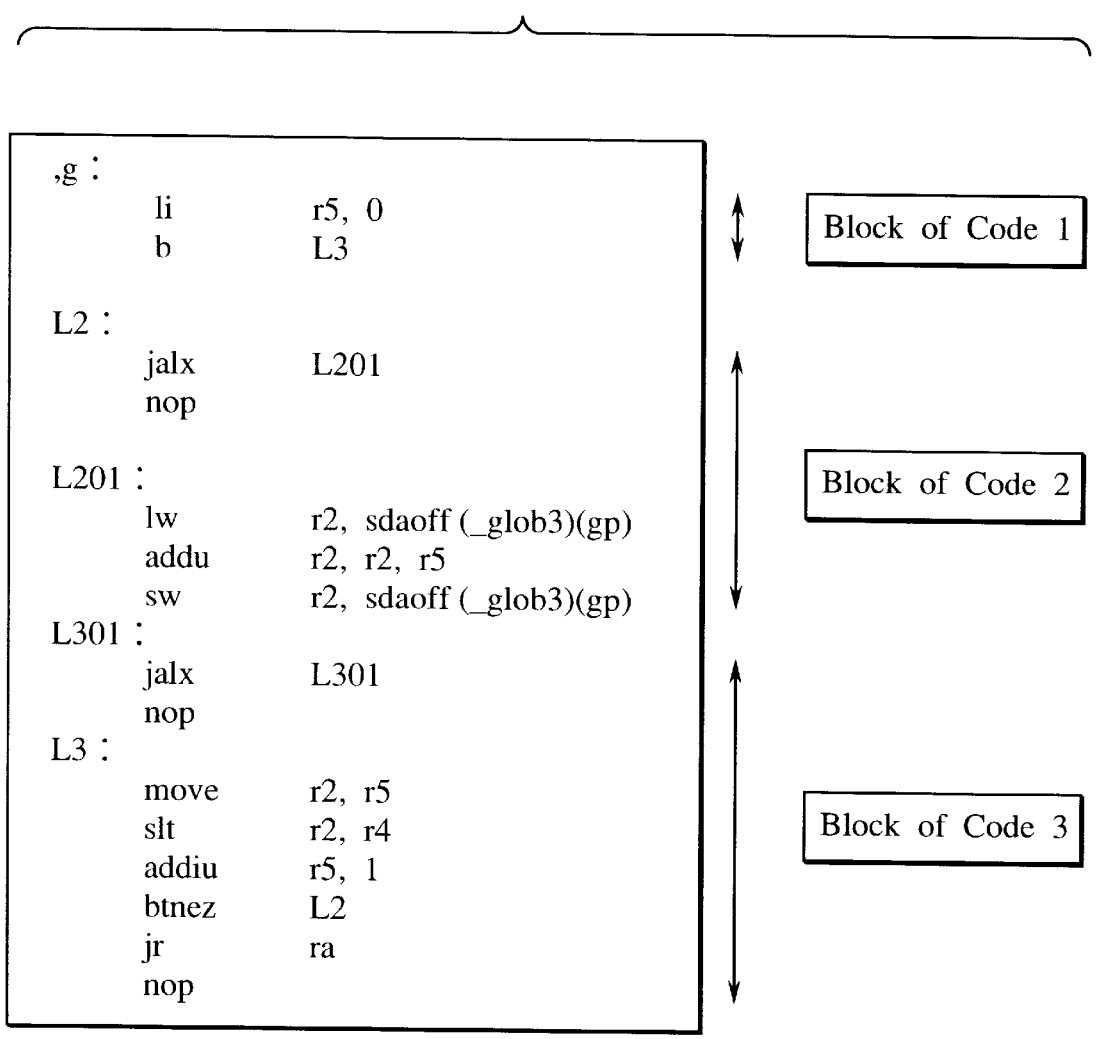
FIG. 16 shows the assembly code as a result of compling the source text of the target program separately utilizing the instruction sets in the blocks of code.

FIG. 16 shows the assembly code as a result of compiling the source text of the target program separately utilizing the instruction sets in the blocks of code. Generally speaking, in the case that the instruction set operating is switched to another instruction set, an instruction set switching instruction is usually inserted into the assembly code. In the same figure, the instruction set switching instruction is the instruction jalx. In this case, the instruction set switching instruction tends to increase the cost either in terms of the size and the clock cycles as required, and therefore these additional costs have to be taken into consideration.

(3) Third Embodiment

Next, the optimized program code generator and the code optimization process in accordance with a third embodiment of the present invention will be explained.

In this embodiment, the code optimization process is applied to the assembly code in which one function is inlined into another function. The cost estimation as explained above is applied after the inlining process in order to determine the most effective instruction set among from the available instruction sets.

FIG. 17 shows the assembly code as a result of the inlining process of the source text of the target program as illustrated in FIG. 6 with the instruction set A. FIG. 18 shows the assembly code as a result of the inlining process of the source text of the target program as illustrated in FIG. 6 with the instruction set B. In this embodiment of the present invention, leaf functions are selected as inline functions. A leaf function is such a function which does not call another function. The leaf functions are extracted from the source text of the target program with reference to the calling instructions appearing therein. The most effective instruction set is selected among from the available instruction sets in order to minimize the cost as estimated by compiling assemble code with each instruction set after each leaf function is inlined into the function which calls that function.

FIG. 19 is a table showing the respective costs of the source text of the target program as illustrated in FIG. 6 as a result of the calculation. As shown in the figure, the costs of the function "main" in which function "f" is inlined are then evaluated as 50 bytes of the size of a memory space to be occupied in the case of the instruction set A and 56 bytes in the case of the instruction set B. On the other hand, as shown in the figure, the clock cycles required for executing the function "main" in which the function "f" is inlined are then evaluated as 25 clock cycles in the case of the instruction set A and 14 clock cycles in the case of the instruction set B.

FIG. 20 is an explanatory table for explaining the procedure of determining the most effective instruction set among from the available instruction sets in the step S204. As shown in the figure, these costs of the function "main" and the function "f" are compared and the most effective instruction sets for each function is selected among from the available instruction sets. In this case, the total cost of the object code as assembled with the instruction set A is improved with the function "main" in which the function "f" is inlined as compared to the case with the separate function "f".

Namely, the code sequence of the target program is simplified by the inlining process in terms of the size of a memory space to be occupied and the speed of running the target program. Furthermore, the optimization is improved from a more global view than the treatment in modules (functions) by the inlining process resulting in more reduced costs.

An modification of the third embodiment of the present invention will be explained. If all the leaf functions are inlined into all the location at which each leaf function is called, the size of a memory space to be occupied the redundancy appearance of the leaf function may possibly be substantially increased, depending upon the actual program. Taking into consideration this situation, in accordance with this embodiment, the function to be inlined into the function which calls that function may be limited to a leaf function which is not called from so many different locations in the program code. For example, the criterion may be such that the number of the different locations does not exceed a predetermined number, e.g., two.

(4) Fourth Embodiment

Next, the optimized program code generator and the code optimization process in accordance with a fourth embodiment of the present invention will be explained.

Figure 21:
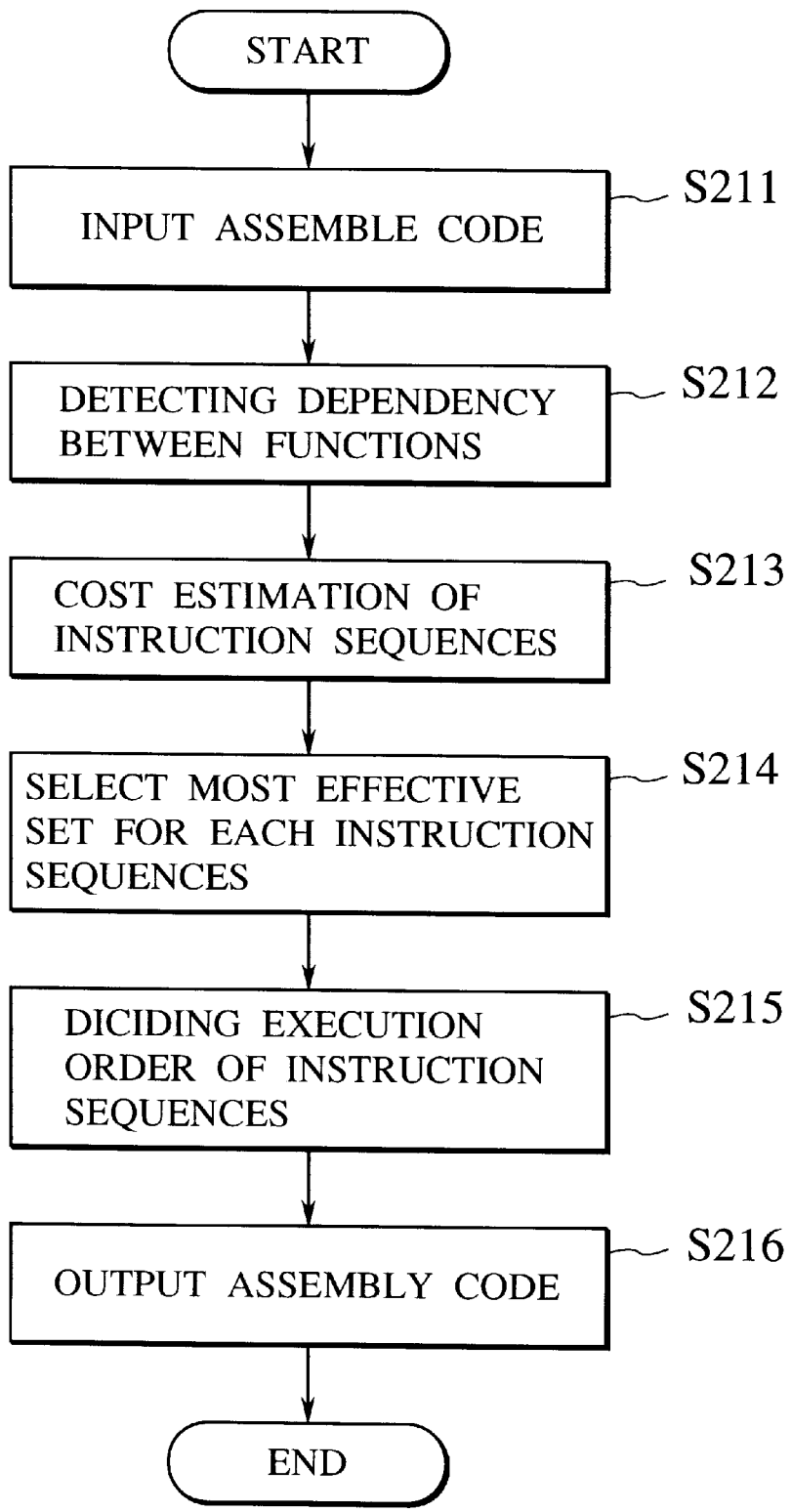
FIG. 21 is a flowchart showing for explaining the proces in the cost estimation step S200 in accordance with the fourth embodiment of the present invention in the form of a compiler.

FIG. 21 is a flowchart showing for explaining the process in the cost estimation step S200 in accordance with the fourth embodiment of the present invention in the form of a compiler. In this embodiment, the code optimization process is applied to each assembly code sequence which is divided from a block of code of statements with respect to the cost estimation table.

First of all, the assembly code is input in the step S211, followed by detecting dependency of the respective instructions of the assembly code one from another in the step S212. The cost calculation is conducted in the step S213 for each of a plurality of independent instruction sequences which consists only of instructions any one of which can be executed independent from any instruction of another independent instruction sequence. A most effective instruction set is selected for each independent instruction sequence among from the available instruction sets in the step S214. Next, assembly code is output in the step S216 after determining the order of execution of the independent instruction sequences while taking into consideration overhead as introduced by inserting the instruction set switching instruction in the step S215.

Figures 22, 23:
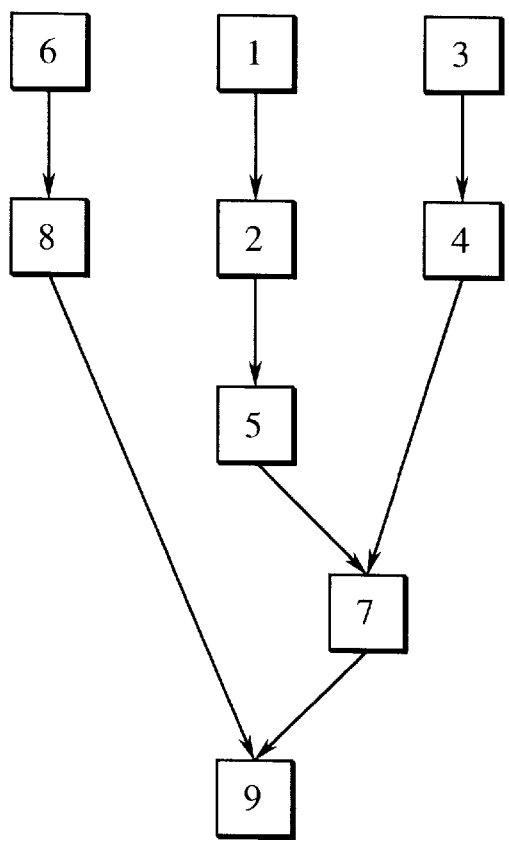
FIG. 22 shows an exemplary assembly code consisting of independent instruction sequences in which parallel execution of a plurality of independent instruction sequences is possible.
FIG. 23 shows the result of the detection of each independent instruction sequence.

FIG. 22 shows an exemplary assembly code consisting of independent instruction sequences in which parallel execution of a plurality of independent instruction sequences is possible. First of all, the assembly code is input in the step S211, followed by detecting dependency of the respective instructions of the assembly code one from another in the step S212. In this case, the dependency is such that execution of the instruction sequence in question can not be proceeded before execution of the preceding instruction sequence. For example, while the preceding instruction sequence includes a load instruction, the subsequent instruction sequence in question includes an addition instruction with an operand updated by the load instruction. In the case of the assembly code as illustrated in FIG. 22, the instructions 6 and 8 can be executed in parallel to execution of instructions 1, 2, 5 and 7. Also, the instructions 3 and 4 can be executed in parallel to execution of instructions 1, 2 and 5. FIG. 23 shows the result of the detection. Next, on the basis of the dependency as detected, the cost calculation is conducted for each independent instruction sequence in the step S213 in order to select the most effective instruction set for each independent instruction sequence among from the available instruction sets. The details of the cost calculation is dispensed with since the cost calculation step S202 as illustrated in FIG. 3 has been fully explained. However, in the case that there are instructions such as instructions 7 and 9 which have the dependency with a plurality of instruction sequences, such instructions are included into an independent instruction sequence with the minimum cost.

As a result of the cost calculation, the instruction set A is selected for assembling the independent instruction sequence consisting of the instructions 6 and 8. Also, the instruction set B is selected for assembling the independent instruction sequence consisting of the instructions 1, 2, 5 while the instruction set A is selected for assembling the independent instruction sequence consisting of the instructions 3, 4, 7 and 9.

Figure 24A:
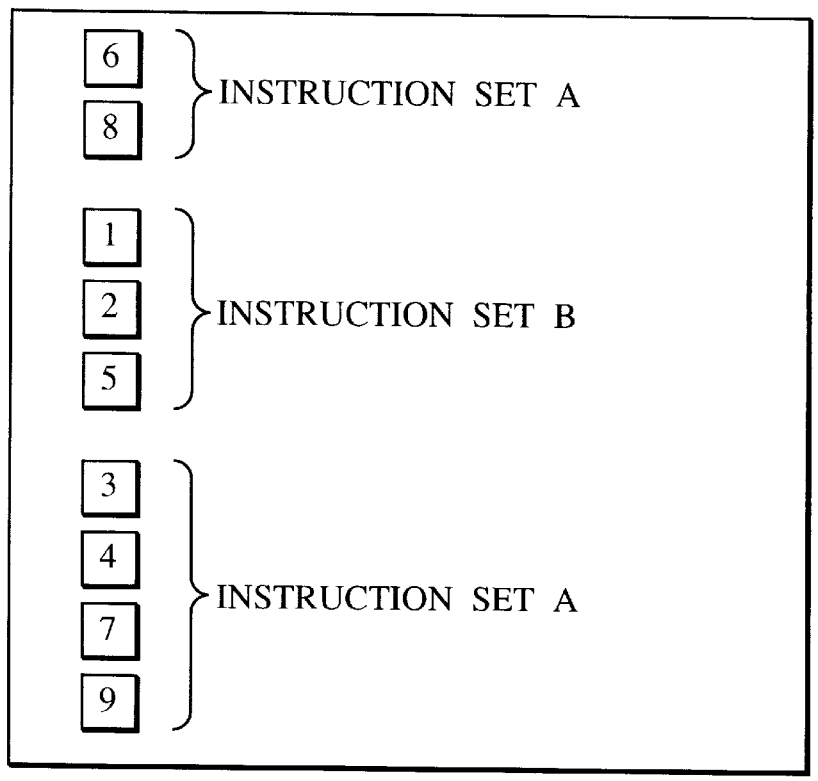
FIGS. 24(a) and 24(b) are views for explaining the procedure in the step S215 as illustrated in FIG. 21.
Figure 24B:
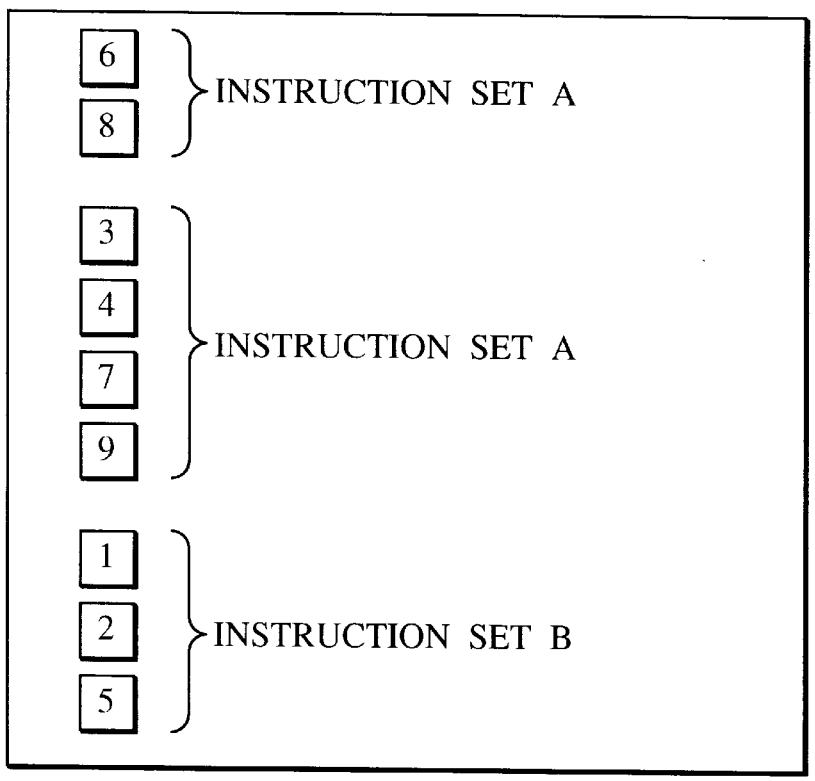

Next, the order of execution of the independent instruction sequences is determined taking into consideration overhead as introduced by inserting the instruction set switching instruction in the step S216. FIG. 24(a) is a view for explaining the procedure in the step S215. Since the instruction set A is selected for the independent instruction sequence consisting of the instructions 6 and 8 and the independent instruction sequence consisting of the instructions 3, 4, 7 and 9, and the instruction set B is selected for the independent instruction sequence consisting of the instructions 1, 2, 5, the instruction set switching instruction has to be executed twice in the execution of instructions 6, 8, 1, 2, 5, 3, 4, 7 and 9 in this order. On the other hand, as illustrated in FIG. 24(b), the instruction set switching instruction has to be executed at only one time in the execution of instructions 6, 8, 3, 4, 7, 9, 1, 2, and 5 in this order. Accordingly, the overhead as introduced by inserting the instruction set switching instruction can be reduced by executing instructions as illustrated in FIG. 24(b). The execution order is determined in this manner taking into consideration overhead as introduced by inserting the instruction set switching instruction. After this process, the resultant assembly code is output as an optimized code. Namely, block of codes are divided from the source text of the target program followed by outputting assembly code of each of the instruction sets. Blocks of codes are divided from the assembly code and then the most effective instruction set is selected for each block of code among from the available instruction sets. Finally, the assembly code is output with the block of code as assembled with the most effective instruction sets respectively in the step S216.

There are two cases that the total cost is reduced by making use of different instruction sets for assembling independent instruction sequences within a single block of code. One of them is such that the total cost of the block of code is simply reduced. The other is such that the block of code is located adjacent to a neighbour block of code which is immediately executed just after or before the block of code in question and assembled with a different instruction set than that of the block of code in question.

Figure 25:
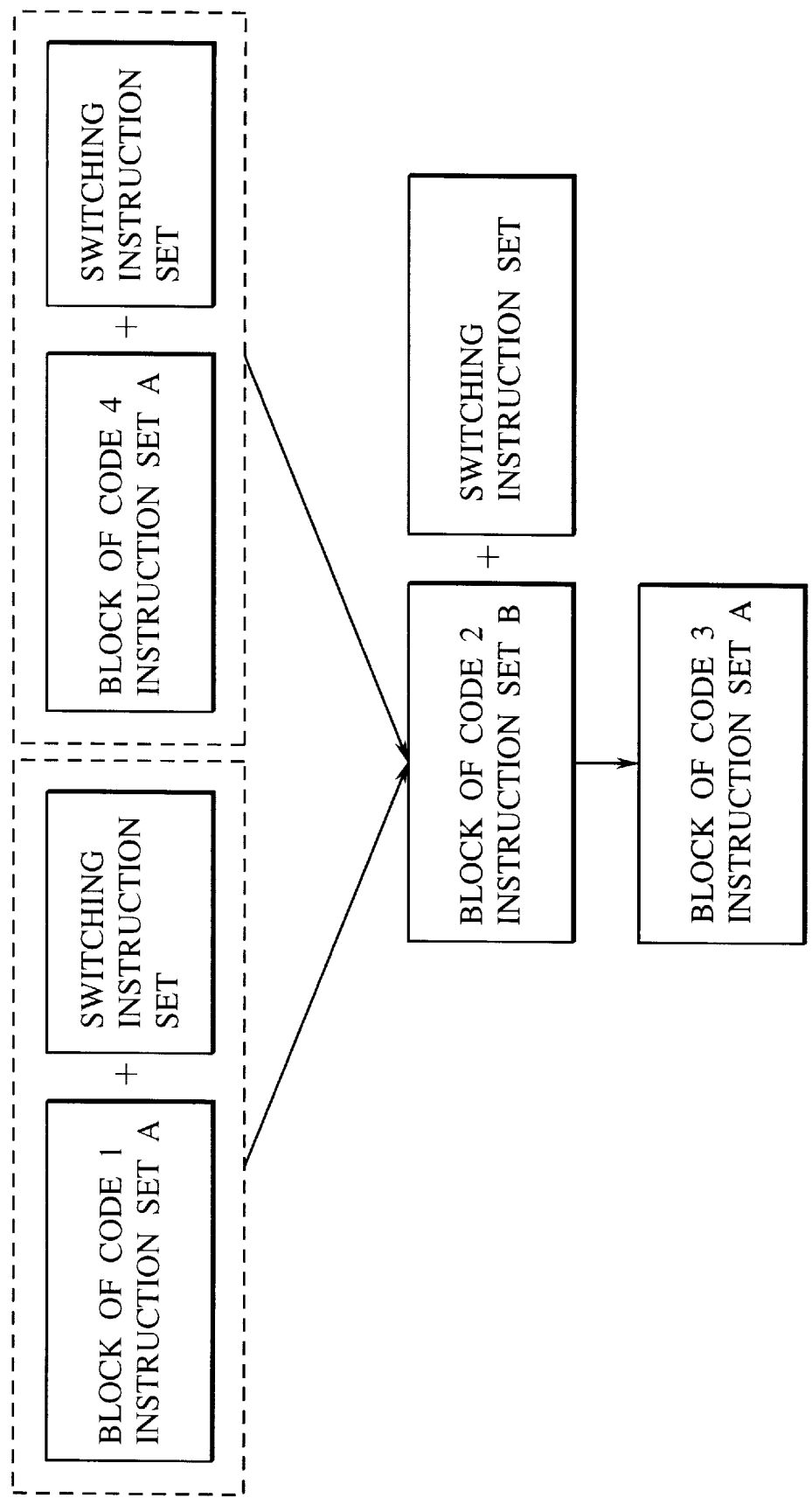
FIG. 25 is a schematic diagram showing the advantage of the embodiment in accordance with the present invention.
Figure 26:
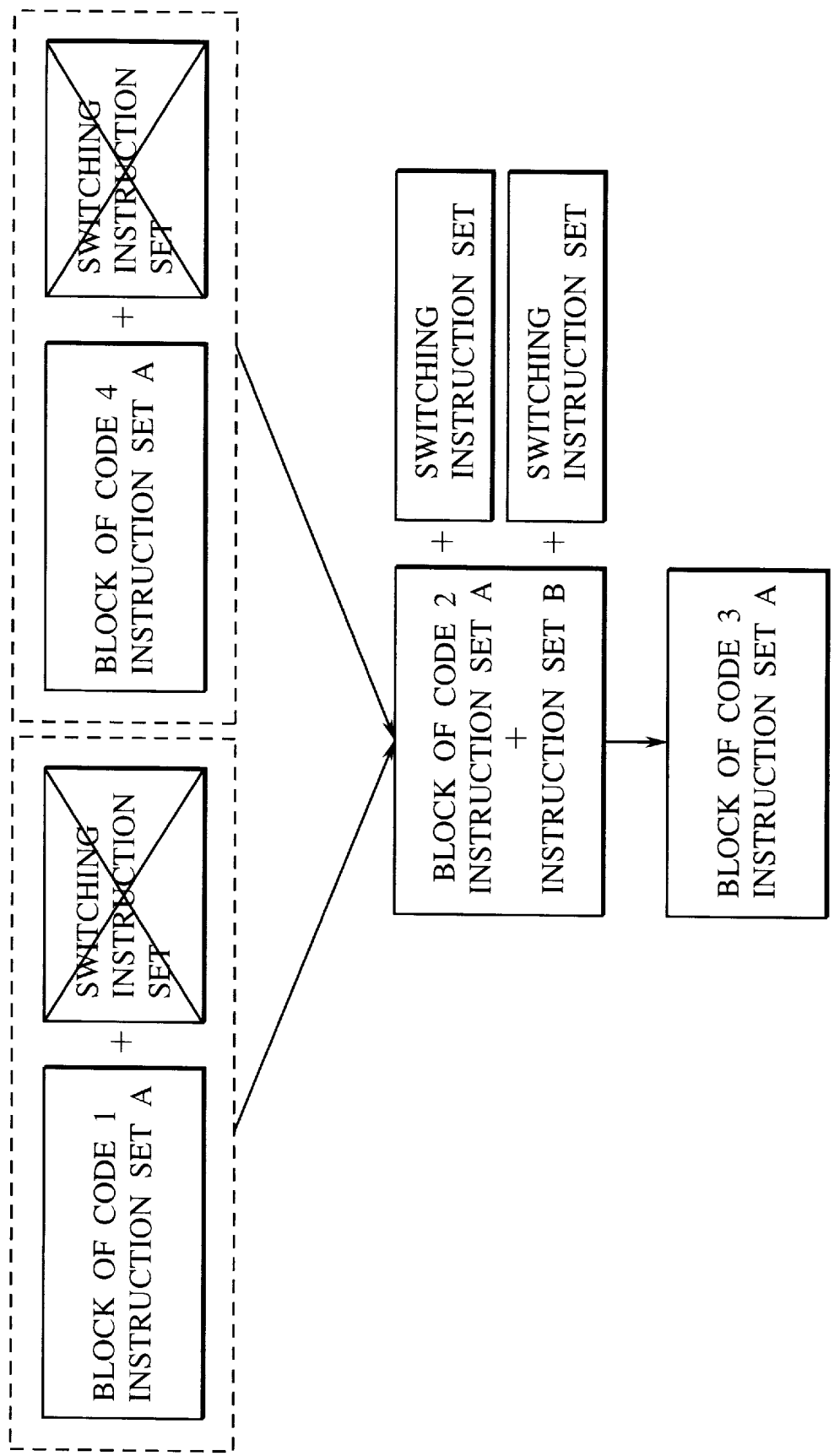
FIG. 26 is a schematic diagram showing the advantage of the embodiment in accordance with the present invention.
Figure 31:
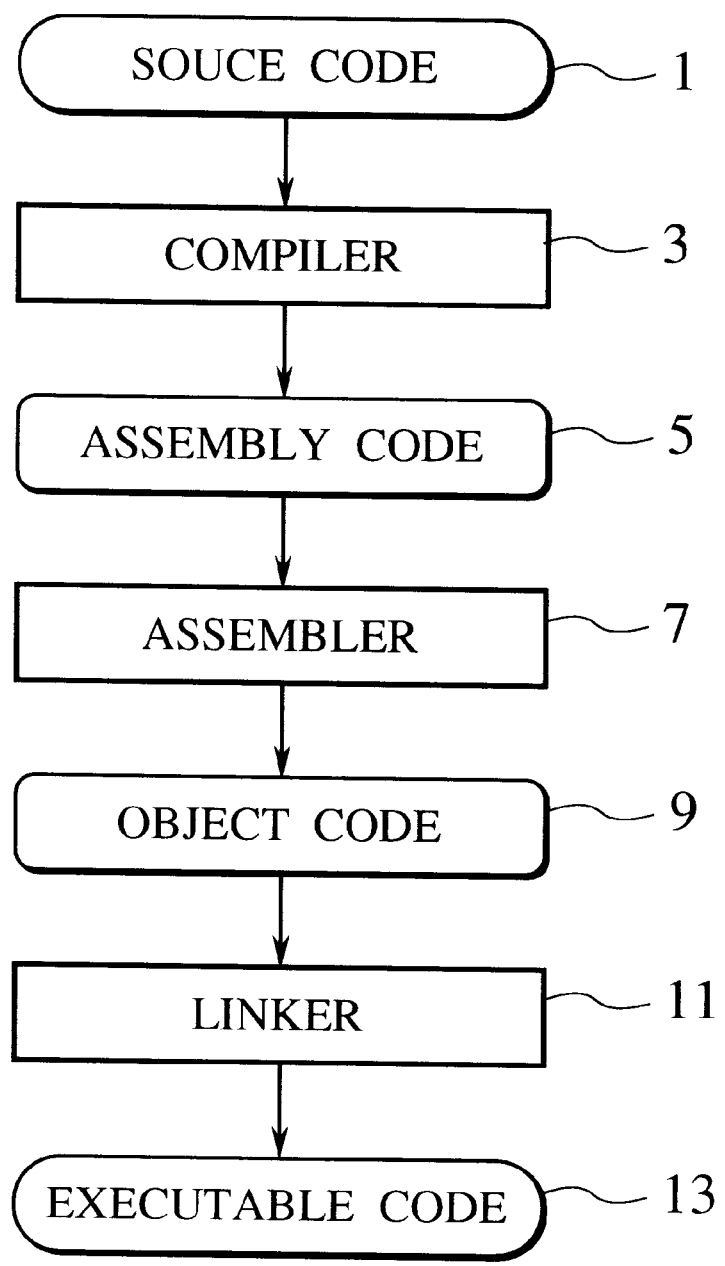
FIG. 31 is block diagram showing a prior art programming language processor.

In the later case, the following situation may possibly be the case as illustrated in FIG. 25 which is a schematic diagram showing the advantage of the embodiment. Namely, the instruction set switching instruction has to be executed for three times after the most effective instruction set is selected for each block of code among from the available instruction sets in accordance with the second embodiment. However, as illustrated in FIG. 26, the instruction set switching instruction is executed for only two times by making use of different instruction sets for assembling independent instruction sequences within a single block of code in accordance with the fourth embodiment. Accordingly, since the overhead of switching instruction sets can be avoided in some cases depending upon adjacent block of codes to the block of code including the instruction sequence in question, it is possible to reduce the total cost of the assembly code.

In the case of this embodiment of the present invention, the scope of the optimization is narrowed within a single block of code so that the total cost is furthermore reduced. Also, the overhead due to the instruction set switching is minimized by the narrowed scope of the optimization.

(5) Fifth Embodiment

Next, the optimized program code generator and the code optimization process in accordance with a fifth embodiment of the present invention will be explained.

In this embodiment, the code optimization process is applied with different criterion for different code sequences each of which is independently evaluated for optimization. This embodiment of the present invention will be explained with respect to FIG. 3. First of all, the assembly code is input in the step S201. The assembly code is as illustrated in FIG. 6. The cost of the assembly code is calculated as explained above in the step S202. Next, it is judged whether or not there is further assembly code on the basis of another instruction set in the step S203. In this embodiment of the present invention, the result of calculation is as illustrated in FIG. 27 for the instruction set A and the instruction set B. The most effective instruction set is then selected among from the available instruction sets in the step S204. However, in this embodiment of the present invention, the number of clock cycles required is evaluated with a higher priority than the size of a memory space for the function "main" while the size of a memory space is evaluated with a higher priority than the number of clock cycles required for the function "f". In this case, therefore, the instruction set B is selected for assembling both the function "main" and the function "f" with respect to the result of calculation as illustrated in FIG. 27.

(6) Sixth Embodiment

Next, the optimized program code generator and the code optimization process in accordance with a third embodiment of the present invention will be explained.

In this embodiment, the code optimization process is applied to the assembly code in which the size of a memory space and the number of clock cycles are evaluated in combination with predetermined weights in order to obtain an appropriate cost estimation. This embodiment of the present invention will be explained with respect to FIG. 3. First of all, the assembly code is input in the step S201. The assembly code is as illustrated in FIG. 6. The cost of the assembly code is calculated as explained above in the step S202 to obtain the result of calculation as illustrated in FIG. 27. In this embodiment of the present invention, a weight factor of 1:4 is given to the size of a memory space and the number of clock cycles for the source text of the target program as illustrated in FIG. 6. In this case, as illustrated in FIG. 29, the instruction set B is used to conduct the optimization with low costs for the function "main" and the function f, and therefore both the functions are compiled with the instruction set B.

The size of a memory space and the number of clock cycles are then evaluated in the same time in order to more specifically comply with actual requirements.

In the embodiment as explained above, the optimization parameters are limited to the size of a memory space to be occupied by machine codes and the number of clock cycles required for executing machine codes. However, other parameters may be employed instead if appropriate. One example is the RAM consumption. The RAM consumption is the size of a memory space to be temporarily occupied for running the target program.

More specifically speaking, the size of a memory space required for running an executable instruction sequence is sum of the static memory, an expected stack memory, an expected heap memory, and the size of a memory space to be occupied by each of said executable instruction sequence. The static memory is statically allocated in a memory space, and therefore can be treated as included in the size of a memory space to be occupied by each of the executable instruction sequence.

On the other hand, the sizes as allocated of the stack memory and the heap memory can not be calculated unless the executable instruction sequence has been actually executed. However, it may be possible to estimate the size of the stack memory by evaluating local variables since the stack memory is allocated and released when calling a function and returning the calling function. Also, it may be possible to estimate the size of the heap memory, e.g., by evaluating memory allocation instructions appearing in the executable instruction sequence since the heap memory is dynamically allocated by the memory allocation instructions.

Furthermore, in the embodiments of the present invention, the assembly codes as output from compilers are evaluated. However, in this case, compiling has to be repeated for the respective instruction sets to take much time. For this reason, it is sometimes effective to conduct cost evaluation with intermediate level language code such as the output of the parser of the compiler provided for analyzing and processing the source text of the target program in the initial process of compiling. In this case, the evaluation time required for selecting the most effective instruction set can be substantially reduced as compared with the case of evaluation of the assembly code. Alternatively, in the case that the evaluation time is not so important, relocatable object files obtained by running an assembler or executable files obtained by running a linker may be used for evaluation.

One aspect of this invention is embodied as a particular program to be coupled with computer hardware for use and stored in any useful recording medium, such as magnetic disks, optical disks, semiconductor memory modules, magnetic tapes and so forth.

Meanwhile, there are several purposes of providing a plurality of instruction set in a processor to which the present invention is applicable. Examples are as follows.

In an exemplary processor, the hardware architecture thereof is mainly designed for one of the instruction sets while another instruction set is provided with relatively small sizes of instruction codes for making possible to develop compact executable codes. In this case, one instruction set is not necessarily a subset of another.

In another exemplary processor, a new architecture is designed to provide hardware compatibility with a conventional architecture by a plurality of instruction sets.

While the present invention has been described in terms of presently preferred and alternate embodiments, those skilled in the art will recognize that the invention is not limited to the embodiments described. The method and apparatus of the present invention can be practiced with modification and alteration within the spirit and scope of the appended claims. The description is thus to be regarded as illustrative instead of limiting on the present invention.

What is claimed is:

1. A optimized program code generator for optimizing a program code for a processor capable of operating on the basis of either one of a plurality of instruction sets in a computer system, the optimization being carried out by the steps of:
   (a) reading said program code of a target program to be optimized,
   (b) estimating the costs of executable instruction sequences respectively to be obtained by translating said program code on the basis of said plurality of instruction sets; and
   (c) determining an optimum one of said plurality of instruction sets for translating said program code by evaluating the costs as estimated under a predetermined criteria.

2. The optimized program code generator as claimed in claim 1 wherein the step of estimating the costs of executable instruction sequences is carried out by the use of a cost estimation table.

3. The optimized program code generator as claimed in claim 2 wherein said cost estimation table includes the cost of each code contained in said object code with respect to the plurality of instruction sets.

4. The optimized program code generator as claimed in claim 1 wherein said program code of the target program to be optimized is assembly code.

5. The optimized program code generator as claimed in claim 1 wherein the step of estimating the costs of executable instruction sequences is carried out by evaluating the object code corresponding to said program code.

6. The optimized program code generator as claimed in claim 1 wherein said object code corresponding to said program code is relocatable.

7. The optimized program code generator as claimed in claim 1 wherein said program code of the target program to be optimized is intermediate level language code as output from a parser.

8. The optimized program code generator as claimed in claim 1 wherein said program code of the target program is written in Language C.

9. The optimized program code generator as claimed in claim 8 further comprising, between the step (a) and the step (b), a step (a2) of translating said program code of the target program written in Language C into assembly code by the use of said plurality of the instruction sets.

10. The optimized program code generator as claimed in claim 9 further comprising, between the step (a2) and the step (b), a step (a3) of detecting dependency of the respective instructions of the assembly code one from another.

11. The optimized program code generator as claimed in claim 1 wherein an optimum one of said plurality of instruction sets for translating said program code is determined for each of a plurality of independent instruction sequences which consists only of instructions any one of which can be executed independent from any instruction of another independent instruction sequence.

12. The optimized program code generator as claimed in claim 11 further comprising, between the step (c) and the step (d), a step (c2) of determining the order of execution of the independent instruction sequences taking into consideration overhead as introduced by inserting an instruction set switching Instruction.

13. The optimized program code generator as claimed in claim 1 wherein an optimum one of said plurality of instruction sets for translating said program code is determined for each function included in said program code.

14. The optimized program code generator as claimed in claim 1 wherein an optimum one of said plurality of instruction sets for translating said program code is determined for each the block of code included in said program code as separated by the branch instruction.

15. The optimized program code generator as claimed in claim 1 wherein the step of estimating the costs of executable instruction sequences is carried out by taking into consideration overhead as introduced by inserting an instruction set switching instruction for switching instruction sets.

16. The optimized program code generator as claimed in claim 1 wherein said predetermined criteria for determining an optimum one of said plurality of instruction sets is based upon comparison of the executable instruction sequences respectively to be obtained by translating said program code into said executable instruction sequences on the basis of different instruction sets in terms of the size of a memory space to be occupied by each of said executable instruction sequence.

17. The optimized program code generator as claimed in claim 1 wherein said predetermined criteria for determining an optimum one of said plurality of instruction sets is based upon comparison of the executable instruction sequences respectively to be obtained by translating said program code into said executable instruction sequences on the basis of different instruction sets in terms of the number of clock cycles required for running each of said executable instruction sequences.

18. The optimized program code generator as claimed in claim 1 wherein said predetermined criteria for determining an optimum one of said plurality of instruction sets is based upon comparison of the executable instruction sequences respectively to be obtained by translating said program code into said executable instruction sequences on the basis of different instruction sets in terms of the size of a memory space to be occupied by each of said executable instruction sequence and the number of clock cycles required for running each of said executable instruction sequences in combination with predetermined weights.

19. The optimized program code generator as claimed in claim 1 wherein said predetermined criteria for determining an optimum one of said plurality of instruction sets is based upon comparison of the executable instruction sequences respectively to be obtained by translating said program code into said executable instruction sequences on the basis of different instruction sets in terms of the size of a memory space to be required for running said executable instruction sequence.

20. The optimized program code generator as claimed in claim 19 wherein the size of a memory space to be required for running said executable instruction sequence is evaluated by sum of the static memory of said executable instruction sequence and the size of a memory space to be occupied by each of said executable instruction sequence.

21. The optimized program code generator as claimed in claim 19 wherein the size of a memory space to be required for running said executable instruction sequence is evaluated by sum of the static memory of said executable instruction sequence, an expected stack memory of said executable instruction sequence, and the size of a memory space to be occupied by each of said executable instruction sequence.

22. The optimized program code generator as claimed in claim 19 wherein the size of a memory space to be required for running said executable instruction sequence is evaluated by sum of the static memory of said executable instruction sequence, an expected stack memory of said executable instruction sequence, an expected heap memory of said executable instruction sequence, and the size of a memory space to be occupied by each of said executable instruction sequence.

23. The optimized program code generator as claimed in claim 1 further comprising, between the step (a) and the step (b), a step (a3) of inlining at least one function contained in said program code of the target program into the function which calls said at least one function.

24. The optimized program code generator as claimed in claim 23 wherein said function inlined into the function which calls that function is a leaf function which does not call another function.

25. The optimized program code generator as claimed in claim 24 wherein said function inlined into the function which calls that function is a leaf function which does not call another function and which is not called from different locations in said program code, the number of which different locations does not exceed a predetermined number.

26. A method for compiling a source text of the target program for a processor capable of operating on the basis of one of a plurality of instruction sets in a computer system, the method comprising the steps of
   (a) reading said source text of the target program of a target program to be compiled into a memory,
   (b) estimating the costs of object code respectively to be obtained by compiling said the source text of the target program on the basis of said plurality of instruction sets;
   (c) determining an optimum one of said plurality of instruction sets for translating said program code by evaluating the costs as calculated under a predetermined criteria; and
   (d) outputting the object as compiled in accordance with the determination of the optimum instruction sets.

27. The method for compiling a source text of the target program as claimed in claim 26 wherein the step of estimating the costs of the object code is carried out by evaluating the respective instruction contained in the object code obtained by compiling said the source text of the target program on the basis of each instruction set.

28. The method for compiling a source text of the target program as claimed in claim 26 wherein said object code corresponding to said program code is relocatable.

29. The method for compiling a source text of the target program as claimed in claim 26 wherein the step of estimating the costs of the object code is carried out by evaluating intermediate level language code as output from a parser.

30. The method for compiling a source text of the target program as claimed in claim 26 wherein the step of estimating the costs of executable instruction sequences is carried out by the use of a cost estimation table.

31. The method for compiling a source text of the target program as claimed in claim 30 wherein said cost estimation table includes the cost of each code contained in said object code with respect to the plurality of instruction sets.

32. The method for compiling a source text of the target program as claimed in claim 26 wherein an optimum one of said plurality of instruction sets is determined for each function included in said program code.

33. The method for compiling a source text of the target program as claimed in claim 26 wherein an optimum one of said plurality of instruction sets is determined for each the block of code included in said program code as separated by the branch instruction.

34. The method for compiling a source text of the target program as claimed in claim 26 wherein the step of estimating the costs of the object code is carried out by taking into consideration overhead as introduced by inserting an instruction set switching instruction for switching instruction sets.

35. The method for compiling a source text of the target program as claimed in claim 26 wherein said predetermined criteria for determining an optimum one of said plurality of instruction sets is based upon comparison of the assembly code respectively obtained on the basis of different instruction sets in terms of the size of a memory space to be occupied by each of said executable instruction sequence.

36. The method for compiling a source text of the target program as claimed in claim 26 wherein said predetermined criteria for determining an optimum one of said plurality of instruction sets is based upon comparison of the assembly code respectively obtained on the basis of different instruction sets in terms of the number of clock cycles required for running each of the object code.

37. A computer-readable medium containing computer-readable program code for optimizing a program code for a processor capable of operating on the basis of either one of a plurality of instruction sets in a computer system, the optimization being carried out by the steps of:
   (a) reading said program code of a target program to be optimized,
   (b) estimating the costs of executable instruction sequences respectively to be obtained by translating said program code on the basis of said plurality of instruction sets; and
   (c) determining an optimum one of said plurality of instruction sets for translating said program code by evaluating the costs as estimated under a predetermined criteria.

38. The computer-readable medium containing computer-readable program code as claimed in claim 37 wherein the step of estimating the costs of executable instruction sequences is carried out by the use of a cost estimation table.

39. The computer-readable medium containing computer-readable program code wherein as claimed in claim 37 said cost estimation table includes the cost of each code contained in said object code with respect to the plurality of instruction sets.

40. The computer-readable medium containing computer-readable program code as claimed in claim 37 wherein said program code of the target program to be optimized is assembly code.

41. The computer-readable medium containing computer-readable program code as claimed in claim 37 the step of estimating the costs of executable instruction sequences is carried out by evaluating the object code corresponding to said program code.

42. The computer-readable medium containing computer-readable program code as claimed in claim 37 said object code corresponding to said program code is relocatable.

43. The computer-readable medium containing computer-readable program code as claimed in claim 37 wherein said program code of the target program to be optimized is intermediate level language code as output from a parser.

44. The computer-readable medium containing computer-readable program code as claimed in claim 37 wherein said program code of the target program is written in Language C.

45. The computer-readable medium containing computer-readable program code as claimed in claim 37 further comprising, between the step (a) and the step (b), a step (a2) of translating said program code of the target program written in Language C into assembly code by the use of said plurality of the instruction sets.

46. The computer-readable medium containing computer-readable program code as claimed in claim 45 further comprising, between the step (a2) and the step (b), a step (a3) of detecting dependency of the respective instructions of the assembly code one from another.

47. The computer-readable medium containing computer-readable program code as claimed in claim 37 wherein an optimum one of said plurality of instruction sets for translating said program code is determined for each of a plurality of independent instruction sequences which consists only of instructions any one of which can be executed independent from any instruction of another independent instruction sequence.

48. The computer-readable medium containing computer-readable program code as claimed in claim 37 further comprising, between the step (c) and the step (d), a step (c2) of determining the order of execution of the independent instruction sequences taking into consideration overhead as introduced by inserting an instruction set switching instruction.

49. The computer-readable medium containing computer-readable program code as claimed in claim 37 wherein an optimum one of said plurality of instruction sets for translating said program code is determined for each function included in said program code.

50. The computer-readable medium containing computer-readable program code as claimed in claim 37 wherein an optimum one of said plurality of instruction sets for translating said program code is determined for each the block of code included in said program code as separated by the branch instruction.

51. The computer-readable medium containing computer-readable program code as claimed in claim 37 wherein the step of estimating the costs of executable instruction sequences is carried out by taking into consideration overhead as introduced by inserting an instruction set switching instruction for switching instruction sets.

52. The computer-readable medium containing computer-readable program code as claimed in claim 37 wherein said predetermined criteria for determining an optimum one of said plurality of instruction sets is based upon comparison of the executable instruction sequences respectively to be obtained by translating said program code into said executable instruction sequences on the basis of different instruction sets in terms of the size of a memory space to be occupied by each of said executable instruction sequence.

53. The computer-readable medium containing computer-readable program code as claimed in claim 37 wherein said predetermined criteria for determining an optimum one of said plurality of instruction sets is based upon comparison of the executable instruction sequences respectively to be obtained by translating said program code into said executable instruction sequences on the basis of different instruction sets in terms of the number of clock cycles required for running each of said executable instruction sequences.

54. The computer-readable medium containing computer-readable program code as claimed in claim 37 wherein said predetermined criteria for determining an optimum one of said plurality of instruction sets is based upon comparison of the executable instruction sequences respectively to be obtained by translating said program code into said executable instruction sequences on the basis of different instruction sets in terms of the size of a memory space to be occupied by each of said executable instruction sequence and the number of clock cycles required for running each of said executable instruction sequences in combination with predetermined weights.

55. The computer-readable medium containing computer-readable program code as claimed in claim 37 wherein said predetermined criteria for determining an optimum one of said plurality of instruction sets is based upon comparison of the executable instruction sequences respectively to be obtained by translating said program code into said executable instruction sequences on the basis of different instruction sets in terms of the size of a memory space to be required for running said executable instruction sequence.

56. The computer-readable medium containing computer-readable program code as claimed in claim 55 wherein the size of a memory space to be required for running said executable instruction sequence is evaluated by sum of the static memory of said executable instruction sequence and the size of a memory space to be occupied by each of said executable instruction sequence.

57. The computer-readable medium containing computer-readable program code as claimed in claim 55 wherein the size of a memory space to be required for running said executable instruction sequence is evaluated by sum of the static memory of said executable instruction sequence, an expected stack memory of said executable instruction sequence, and the size of a memory space to be occupied by each of said executable instruction sequence.

58. The computer-readable medium containing computer-readable program code as claimed in claim 55 wherein the size of a memory space to be required for running said executable instruction sequence is evaluated by sum of the static memory of said executable instruction sequence, an expected stack memory of said executable instruction sequence, an expected heap memory of said executable instruction sequence, and the size of a memory space to be occupied by each of said executable instruction sequence.

59. The computer-readable medium containing computer-readable program code as claimed in claim 37 further comprising, between the step (a) and the step (b), a step (a3) of inlining at least one function contained in said program code of the target program into the function which calls said at least one function.

60. The computer-readable medium containing computer-readable program code as claimed in claim 37 wherein said function inlined into the function which calls that function is a leaf function which does not call another function.

61. The computer-readable medium containing computer-readable program code as claimed in claim 37 wherein said function inlined into the function which calls that function is a leaf function which does not call another function and which is not called from different locations in said program code, the number of which different locations does not exceed a predetermined number.

* * * * *